United States Patent [19]

Nakasho

[11] Patent Number: 4,672,475
[45] Date of Patent: Jun. 9, 1987

[54] PORTABLE VIDEO TAPE RECORDER HAVING A VIBRATION DETECTOR

[75] Inventor: Tsugutada Nakasho, Saijo, Japan

[73] Assignee: Matsushita Electric Industrial Co., Ltd., Japan

[21] Appl. No.: 847,266

[22] Filed: Apr. 2, 1986

[51] Int. Cl.[4] .......................... G11B 5/52; G11B 15/02
[52] U.S. Cl. ........................................ 360/70; 360/60; 360/75
[58] Field of Search ..................... 358/335, 337, 338; 360/60, 70, 75

[56] References Cited

U.S. PATENT DOCUMENTS 4,325,089  4/1982  Hsu ......................................... 360/60
4,445,145  4/1984  Moriya .................................. 360/10.2
4,573,087  2/1986  Tezuka et al. ........................ 360/60

Primary Examiner—George G. Stellar
Attorney, Agent, or Firm—Lowe, Price, LeBlanc, Becker & Shur

[57] ABSTRACT

A portable video tape recorder includes a tachogenerator which generates an actual speed signal representative of the angular velocity of a video head and an actual phase signal representative of the angular position of the head. A frequency comparator generates a speed control signal representative of the deviation of the actual speed signal from a reference speed signal and a phase comparator generates a phase control signal representative of the deviation of the actual phase signal from a reference phase signal. The speed and phase control signals are summed and applied to the motor. A detector is provided for detecting when the deviation of the actual phase signal exceeds a predetermined level and generating a warning signal to alert the user either in visual or audible form to prevent external vibration from severely disturbing the angular position of the video head.

15 Claims, 6 Drawing Figures

PORTABLE VIDEO TAPE RECORDER HAVING A VIBRATION DETECTOR

BACKGROUND OF THE INVENTION

The present invention relates generally to portable helical-scan video tape recorders, and more specifically to a circuit for controlling the angular velocity and angular position of video heads mounted on a rotary cylinder.

In video tape recorders, the angular velocity and angular position of video heads are precisely controlled by error signals which are derived by comparison between reference speed and position signals and actual speed and position signals, respectively, so that each video head may precisely trace intended tracks during both recording and playback modes. Because of the high degree of precision with which the rotary mechanism is constructed, the rotation of the heads is easily disturbed by an external shock. In cases where the recorder is of a compact portable type, such disturbances occur frequently, causing the angular position of the heads to deviate from the reference phase with a resultant deviation of heads from the intended track.

One approach is to employ a playback head to play back the recorded material immediately after it is recorded, so that the user is able to monitor the quality of the recording. However, this type of approach is not satisfactory to portable video tape recorders of modest price since it adds to the complexity of the rotary mechanism with a resultant increase in equipment size and cost.

SUMMARY OF THE INVENTION

Accordingly, an object of the present invention is to provide a motor control circuit for a portable video tape recorder having a vibration detector for generating a warning signal when the deviation of angular position of video heads exceeds a predetermined value.

Specifically, the control circuit of the invention comprises a tachogenerator for generating an actual speed signal representative of the angular velocity of the video head and an actual phase signal representative of its angular position. A frequency comparator generates a speed control signal representative of the deviation of the actual speed signal from a reference speed signal and a phase comparator generates a phase control signal representative of the deviation of the actual phase signal from a reference phase signal. The speed and phase control signals are summed and applied to the motor. A detector is provided for detecting when the deviation of the actual phase signal exceeds a predetermined value and generating a warning signal to alert the user to prevent external vibration from severely disturbing the angular position of the video head.

BRIEF DESCRIPTION OF THE DRAWINGS

The present invention will be described in further detail with reference to the accompanying drawings, in which.

DETAILED DESCRIPTION

Figure 1:
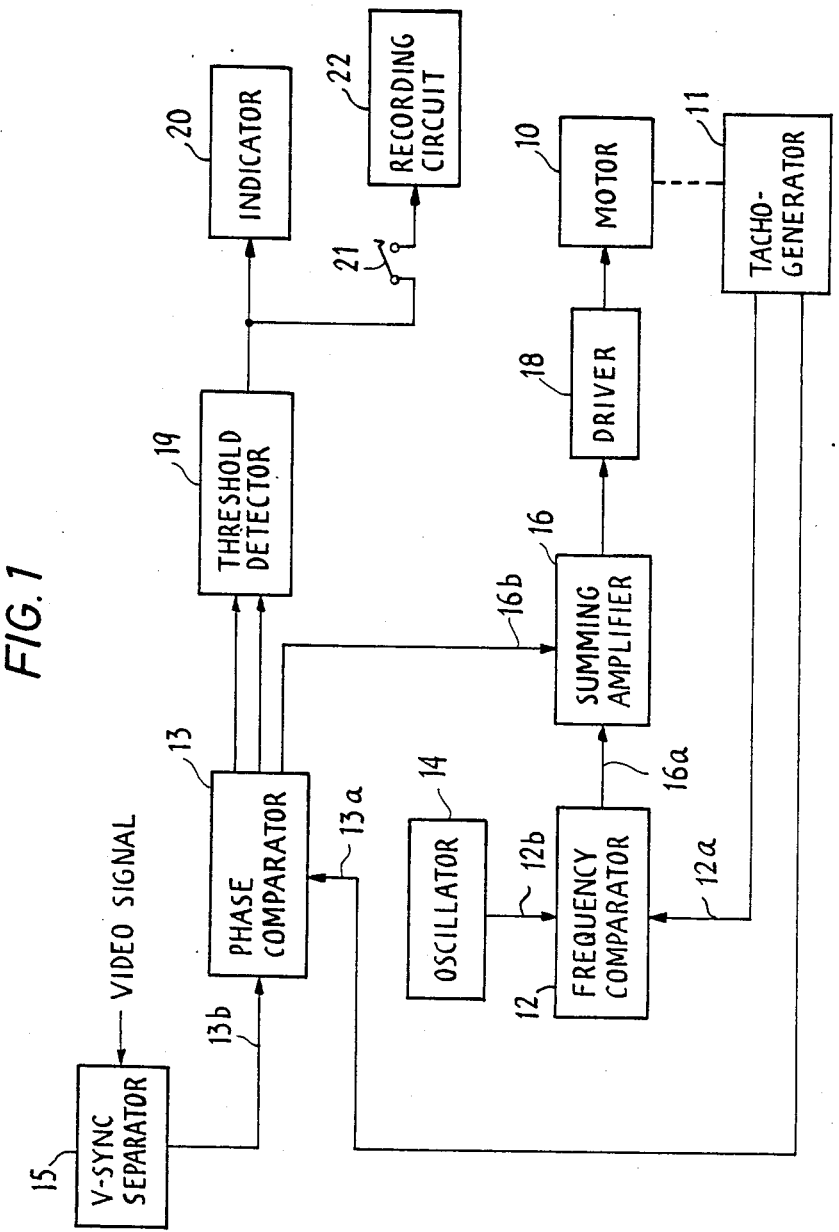
FIG. 1 is a block diagram of a motor control circuit according to an embodiment of the invention.

Referring to FIG. 1, there is shown a motor control circuit for a portable video tape recorder (VTR) according to one embdiment of the invention. The helical-scan rotary cylinder of the VTR carriers a pair of video heads in diametrically opposite positions of its circumference and is driven by a motor 10. A tachogenerator 11 is coupled to the rotor shaft of the motor to detect the angular velocity and and angular position of the video heads and supply a speed-related pulse signal to an input terminal 12a of a frequency comparator 12 and a phase-related pulse signal to an input terminal 13a of a phase comparator 13. An oscillator 14 supplies a frequency reference signal to a second input terminal 12b of frequency comparator 12. Comparator 12 develops a voltage signal representative of the deviation of angular velocity of the video heads from a speed reference represented by the reference frequency of oscillator 14 and supplies the speed deviation signal to an input terminal 16a of a summing amplifier 16. To an input terminal 13b of phase comparator 13 is applied a reference phase signal which is obtained from a vertical sync separator 15 to which the video signal of the VTR is applied.

Phase comparator 13 develops a voltage signal representative of the amount and direction of phase deviation of the video heads from the phase reference of the VTR and supplies the phase deviation signal to a second input ternal 16b of summing amplifier 16 where it is summed with the speed deviation signal. The output of summing amplifier 16 is coupled to a driver 18. Driver 18 has a loop gain characteristic which stays flat over input frequencies ranging from DC to a particular high frequency value, typically at 1 kHz to 10 kHz, and then decays linearly with increase in frequency from that particular frequency value. The phase control characteristic of the system becomes increasingly stable with a loop gain having a wider flat range.

As will be discussed below, phase comparator 13 further supplies a pair of pulse signals to a threshold detector 19. The pulses of each pulse signals are shifted with respect to those of the other pulse signal by an amount proportional to the detected phase error. Threshold detector 19 generates a warning signal when the phase error exceeds a prescribed value and activates a visual or audible indicator 20. A switch 21 is preferably connected to the output of threshold detector 19 to apply the warning signal to disable the recording circuit 22 of the VTR to momentarily disable the recording operation if desired.

Figure 2:
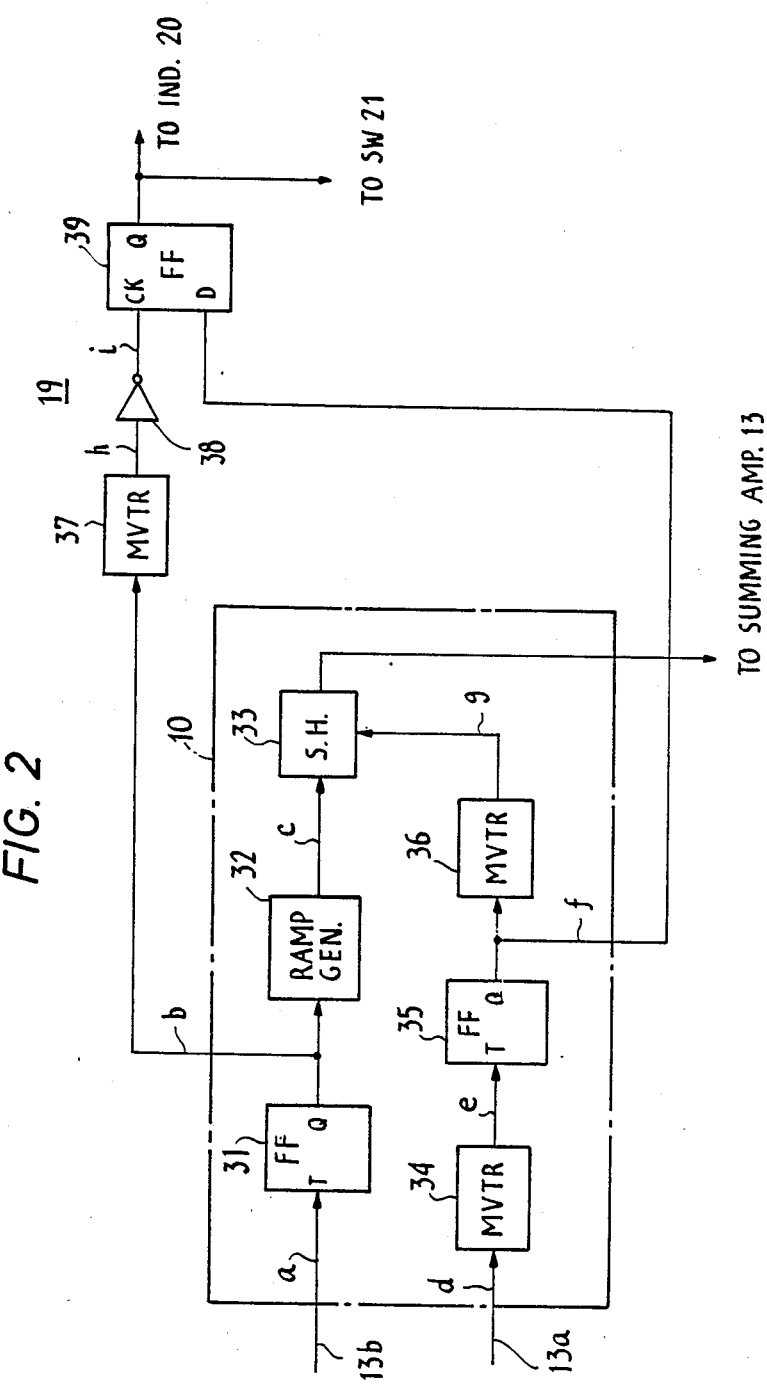
FIG. 2 is an illustration of details of the phase comparator and threshold detector of FIG. 1.
Figure 3:
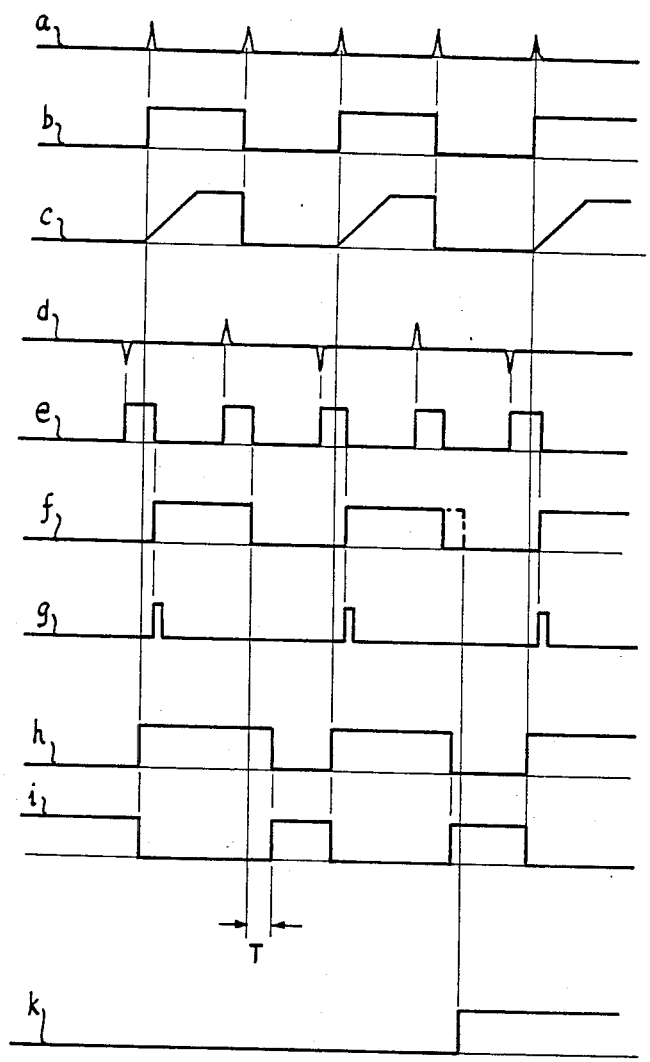
FIG. 3 is a waveform diagram associated with FIG. 2.

In FIG. 2, details of the phase comparator 13 and threshold detector 19 are illustrated. The reference phase signal, as indicated by a waveform a in FIG. 3, is applied from sinc separator 15 on line 13b to the T input of a flip-flop 31 which responds to it by supplying a series of 50%-duty phase reference pulses b to a ramp generator 32. A series of ramp-voltage pulses c is supplied from ramp generator 32 to a sample-and-hold circuit 33. The phase-related pulse signal, as indicated by a waveform d of alternating pulses, is applied to a monostable multivibrator 34 which responds to each of the oppositely-going pulses by supplying series of constant-duration pulses e to the T input of a flip-flop 35 to cause it to generate a series of 50%-duty pulses f. Thus, pulse signals b and f have the same pulse duration when the motor 10 has attained the reference speed. If the angular position of the video heads deviates with resepct to the reference phase, pulses f occur at timing which is displaced from the time of occurrence of phase reference pulses b by an amount proportional to the deviation of the angular position. The output of flip-flop 35 is applied to a monostable multivibrator 36 which generates a sampling pulse g for the sample-and-hold circuit 33. The sampled ramp voltage is applied to the summing amplifier 13 as the phase difference signal.

Threshold detector 19 comprises a monostable multivibrator 37 which is triggered in response to reference phase pulses b to generate pulses h which are inverted by an inverter 38, producing a series of phase reference pulses i. Reference phase pulses i are applied to the clock input of a D flip-flop 39 and actual phase pulses f are applied to the D input of flip-flop 39. Flip-flop 39 is clocked in response to the leading edge of reference pulses i to detect whether the D input is at logical "1" or logical "0".

The period of monostable multivibrator 34 is appropriately determined so that the trailing edge of actual phase pulses f normally leads a time duration T with respect to the leading edge of reference phase pulses i as illustrated in FIG. 3. Therefore, the output of D flip-flop 39 is normally at logical "0". If a violent shock is applied to the housing of the portable VTR to such an extent that the rotation of the cylinder is affected, there would result in a phase lag greater than the period T in actual phase pulses f and their trailing edges occur following the leading edges of reference phase pulses i, causing D flip-flop 39 to produce a logical "1" output as indicated by a waveform k. Visual indicator 20 is thus activated to alert the user.

If switch 21 is closed by the user, the warning signal disables the recording operation of the VTR until the phase deviation restores to normal.

In this way, warning signals are generated whenever the VTR is roughly handled to such an extent that the resultant phase deviation causes abnormality in recorded material. By roughly handling the VTR on purpose or by experience users can train themselves to feel the range in which the phase deviation no longer affects the quality of recorded material.

Figure 4:
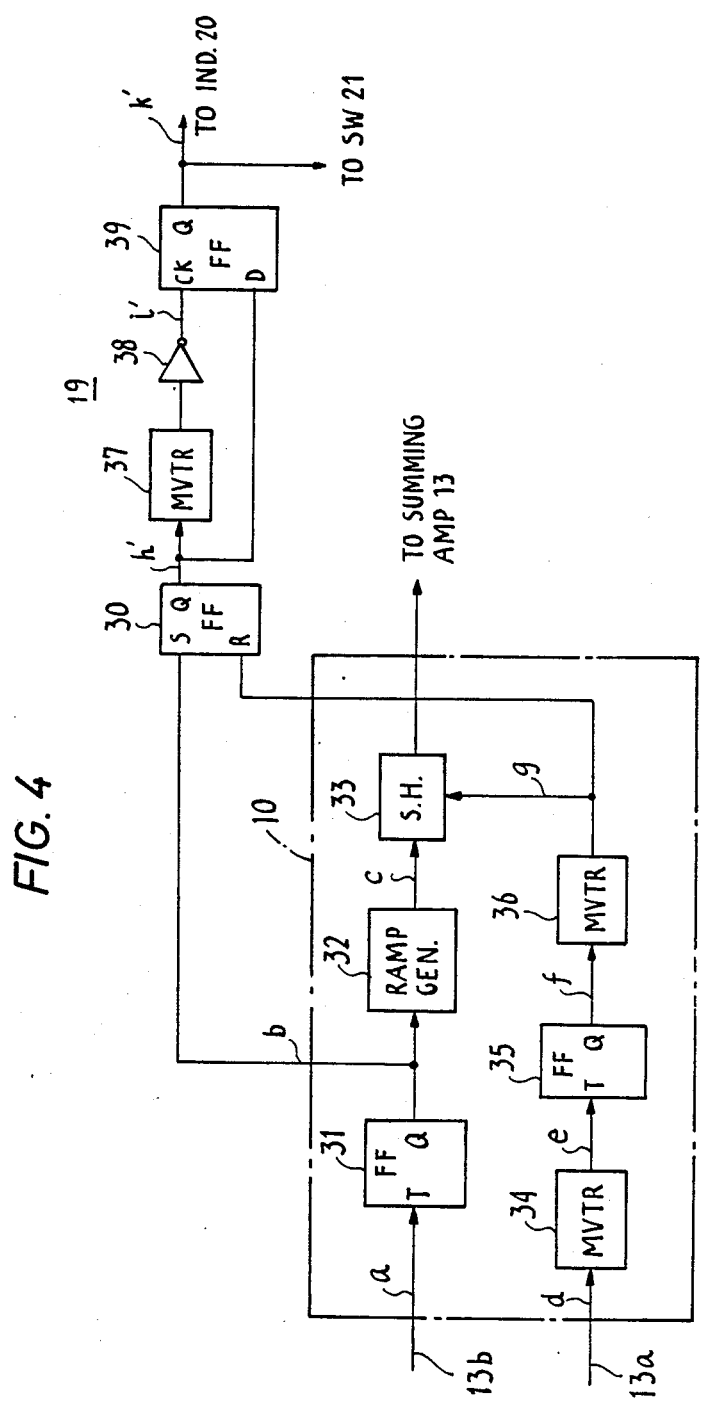
FIG. 4 is a block diagram of a modified embodiment of the invention.
Figure 5:
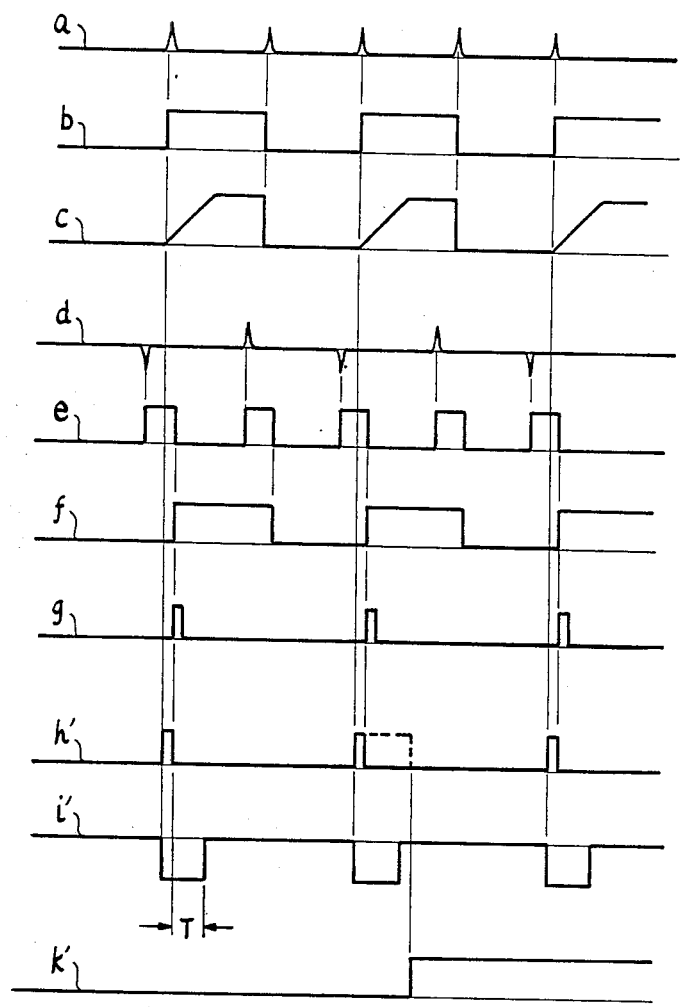
FIG. 5 is a waveform diagram associated with FIG. 4.

In FIG. 4, a modification of the invention is illustrated. In this modification, threshold detector 19 additionally includes a flip-flop 30 having a set input connected to the output of flip-flop 31 and a reset input connected to the output of multivibrator 36. The output of flip-flop 30 is a variable-duration pulse of which the duration is a fucntion of the phase difference detected by phase comparator 10. The output of flip-flop 30 is applied to multivirator 37 and to the D input of flip-flop 39. As illustrated in FIG. 5, the operation of the embodiment of FIG. 4 is similar to that of the FIG. 2 embodiment with the exception that flip-flop 30 generates a mono-pulse h' with a duration between the leading edge of pulses b and the leading edge of pulse g. In response to pulses h', multivibrator 37 produces pulses of a constant duration longer than the minimum duration of pulses h', so that the output of inverter 38, shown at i', remains low for a predetermined period starting with the leading edge of the pulse h'. If phase error occurs and the duration of pulses h' extends beyond the period of the multivibrator 37, the output of D flip-flop 39 switches to logical "1" to activate the indicator 20.

Figure 6:
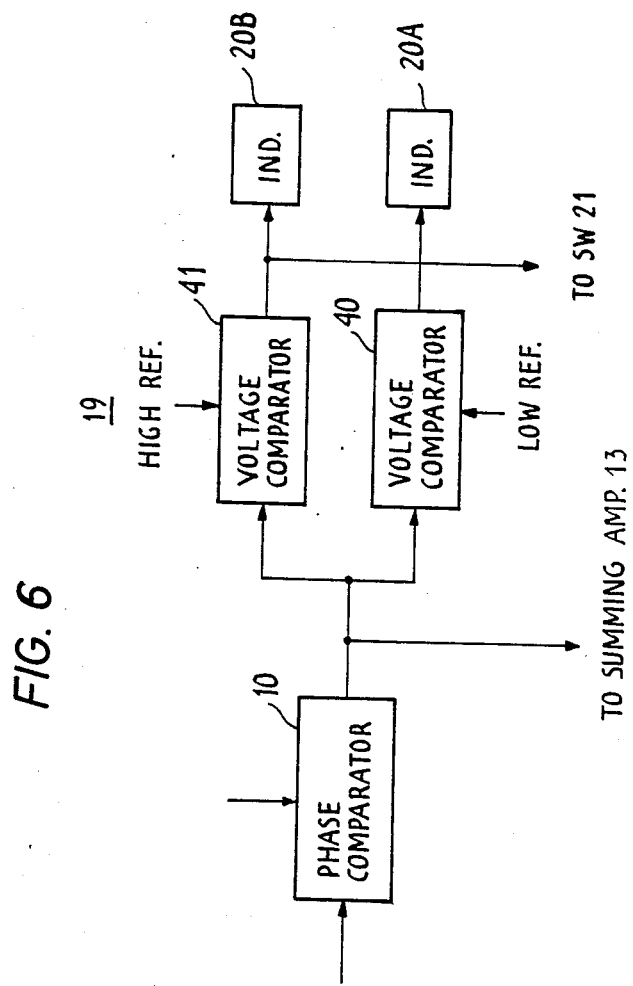
FIG. 6 is a block diagram of a further modification of the invention.

Another modification of the invention is illustrated in FIG. 6. In this modification, the phase-error voltage signal is applied to threshold detector 19. Threshold detector 19 comprises voltage comparators 40 and 41 which compares the phase error voltage with low and high reference thresholds, respectively. The low and high thresholds respectively correspond to predetermined small and large phase deviations. If the phase error exceeds the predetermined small deviation, comparator 40 generates an output that activates an indicator 20A and if it exceeds the large deviation, comparator 41 then activates another indicator 20B. The output of comparator 41 is also coupled through the switch 21 to the recording circuit to disable the recording operation. The indication given by indicator 20A serves as a precaution against external shock of larger magnitudes.

What is claimed is:

1. A control circuit for controlling a motor which drives a cylinder of a portable video tape recorder, said cylinder carrying a video head on the circumference thereof, comprising:
    first means coupled to said motor for generating a first signal representative of the angular velocity of said video head and a second signal representative of the angular position of said video head;
    second means for generating a speed control signal representative of the deviation of said first signal from a reference speed signal;
    third means for generating a phase control signal representative of the deviation of said second signal from a reference phase signal;
    fourth means for summing said speed and phase control signals and driving said motor with the summed signals; and
    fifth means for detecting when the deviation of said second signal exceeds a predetermined value and generating a warning signal.

2. A control circuit as claimed in claim 1, wherein said reference phase signal is a vertical synchronization signal.

3. A control circuit as claimed in claim 1, wherein said fifth means comprises a monostable multivibrator responsive to said reference phase signal and a D flip-flop having a clock input terminal responsive to an output signal from said monostable multivibrator and a D input terminal responsive to said second signal.

4. A control circuit as claimed in claim 1, wherein said fifth means comprises means for comparing said phase control signal with a reference level representing said predetermined value and generating said warning signal when said phase control signal exceeds said reference level.

5. A control circuit as claimed in claim 1, wherein said fifth means comprises means for generating a pulse having a variable duration that is a function of said phase control signal, a monstable multivibrator responsive to said pulse and a D flip-flop having a clock input terminal responsive to an output signal from said monostable multivibrator and a D input terminal responsive to said pulse.

6. A control circuit as claimed in claim 1, wherein said fifth means comprises means for comparing said phase control signal with a plurality of reference levels and generating a plurality of warning signals of different significances when said phase control signal successively exceeds said reference levels.

7. A control circuit as claimed in claim 1, further comprising means for disabling a recording circuit of said video tape recorder in response to said warning signal.

8. A control circuit as claimed in claim 7, further comprising a manually controlled switch means for inhibiting the disablement of said recording circuit.

9. A portable video tape recorder having a cylinder carrying a video head on the circumference thereof and a motor for driving said cylinder, comprising:
- first means coupled to said motor for generating a first signal representative of the angular velocity of said video head and a second signal representative of the angular position of said video head;
- second means for generating a speed control signal representative of the deviation of said first signal from a reference speed signal;
- third means for generating a phase control signal representative of the deviation of said second signal from a reference phase signal;
- fourth means for summing said speed and phase control signals and driving said motor with the summed signals; and
- fifth means for detecting when the deviation of said second signal exceeds a predetermined value and generating a warning signal.

10. A portable video tape recorder as claimed in claim 9, wherein said fifth means comprises a monostable multivibrator responsive to said reference phase signal and a D flip-flop having a clock input terminal responsive to an output signal from said monostable multivibrator and a D input terminal responsive to said second signal.

11. A portable video tape recorder as claimed in claim 9, wherein said fifth means comprises means for comparing said phase control signal with a reference level representing said predetermined value and generating said warning signal when said phase control signal exceeds said reference level.

12. A portable video tape recorder as claimed in claim 9, wherein said fifth means comprises means for generating a pulse having a variable duration that is a function of said phase control signal, a monstable multivibrator responsive to said pulse and a D flip-flop having a clock input terminal responsive to an output signal from said monostable multivibrator and a D input terminal responsive to said pulse.

13. A portable video tape recorder as claimed in claim 9, wherein said fifth means comprises means for comparing said phase control signal with a plurality of reference levels and generating a plurality of warning signals of different significances when said phase control signal successively exceeds said reference levels.

14. A portable video tape recorder as claimed in claim 9, further comprising means for disabling a recording circuit of said video tape recorder in response to said warning signal.

15. A portable video tape recorder as claimed in claim 14, further comprising a manually controlled switch means for inhibiting the disablement of said recording circuit.

* * * * *